Nov. 1, 1938. A. TROSCH Re. 20,906
WORK TABLE FOR BORING MILLS AND THE LIKE
Original Filed April 27, 1936
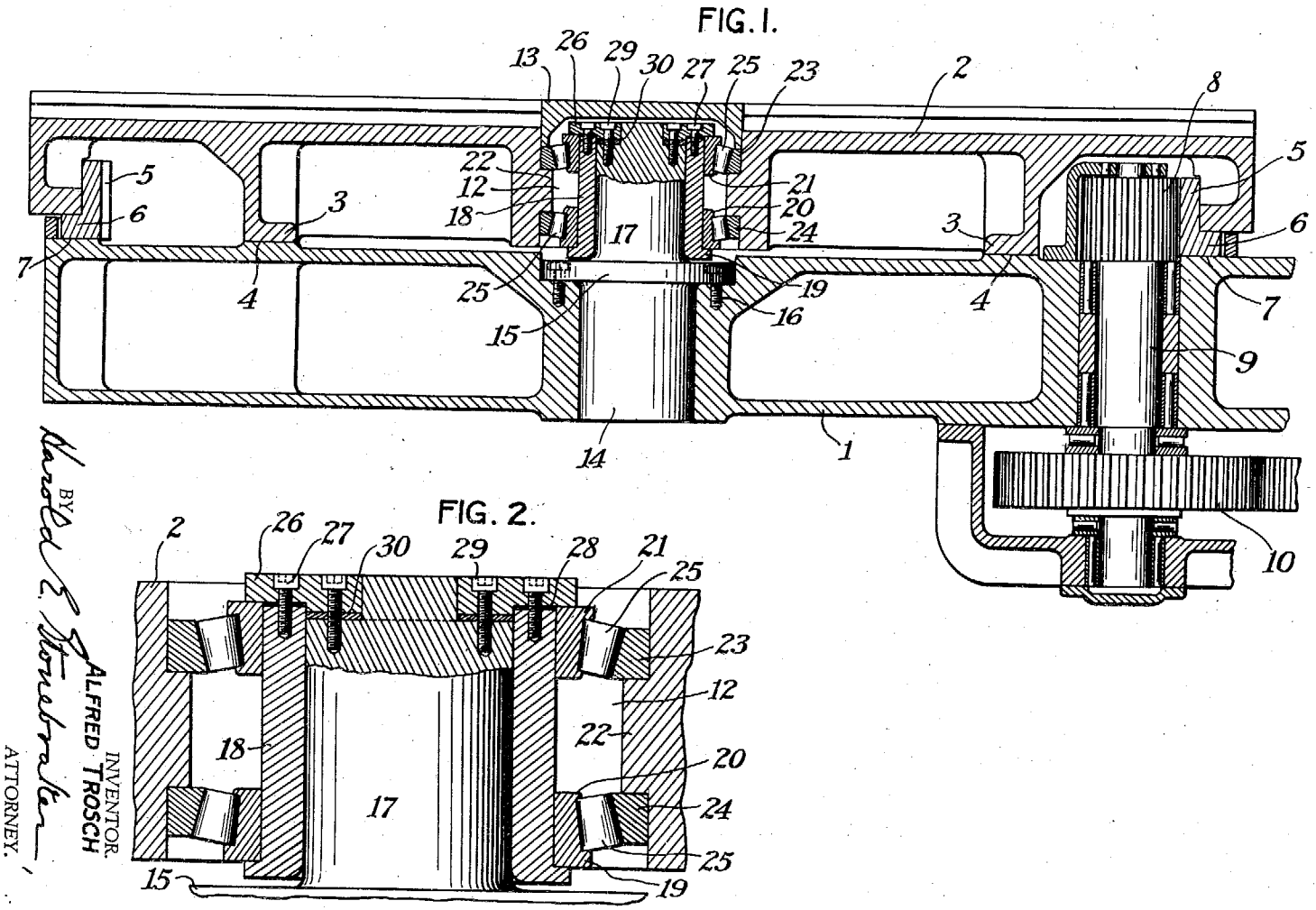
INVENTOR.
ALFRED TROSCH
BY Harold E. Stonebraker,
ATTORNEY.

Reissued Nov. 1, 1938

Re. 20,906

UNITED STATES PATENT OFFICE 20,906

WORK TABLE FOR BORING MILLS AND THE LIKE

Alfred Trosch, Rochester, N. Y., assignor to Consolidated Machine Tool Corporation, Rochester, N. Y., a corporation of Delaware Original No. 2,068,523, dated January 19, 1937, Serial No. 76,537, April 27, 1936. Application for reissue August 27, 1938, Serial No. 227,212

10 Claims. (Cl. 77—63)

This invention relates to rotating work tables such as commonly employed in vertical boring mills and the like, of a type wherein a central post or projection up-rising from a supporting base or bed, is equipped with provision for accurately centering the table and holding it in correct adjustment.

A principal object of the invention is to provide a novel arrangement of spaced apart bearings between such post or projection and the table whereby the table is more readily and accurately centered. A further object is to provide a novel bearing construction between such posts and the table which also prevents any upward displacement of the table. A still further object is to provide a novel arrangement of vertically spaced apart bearings between the centering post and the table equipped with means for simultaneous and equalized adjustment of such bearings.

The foregoing and other objects and advantages of the invention will be better understood from the following detailed description taken in connection with the accompanying drawing and the distinctive features of novelty will be thereafter pointed out in the appended claims.

In the drawing:

Fig. 1 is a vertical sectional view taken centrally of the work table of a boring mill, and showing one embodiment of the invention, and Fig. 2 is an enlarged sectional view of the bearing assembly.

Referring to the drawing, 1 designates a stationary base or bed of a vertical boring mill, and 2 is a work table adapted to be supported upon the base and rotated thereon. To this end, the work table 2 has a depending flange 3 that rests upon and travels around on the supporting surface 4 of the base or bed, and 5 is an internal ring gear rigidly secured to the work table and including a bottom flange 6 which rests upon and travels on the outer portion 7 of the base. The ring gear 5 is engaged and driven by a pinion 8 carried by a spindle 9 that is journalled in the base 1 and carried at its lower end is a gear 10 to which motion is transmitted through gearing from any suitable source of power.

In order to insure free and true rotation of the work table with relation to its center, and to prevent any upward, downward, or twisting tendencies, the table is arranged to travel around bearings located between its top and bottom and in horizontal alinement generally with the driving pinion 8 and ring gear 5. To accomplish this end, the table has a central opening designated at 12, and provided with a cap or cover 13, that is removable to permit access to the bearings for adjustment. Into this central opening of the table a post or upward projection from the base extends with a clearance to provide for the bearings to be presently described. As herein illustratively shown this upward projection from the bed 1 is a separate and inserted member provided with a central pillar 14 carrying a flange 15 that is rigidly secured to the base by bolts 16 and has an upstanding axle or post 17 that extends upwardly into the opening 12 of the table.

Slidably mounted upon the post or axle 17 is a collar 18 having an outwardly projecting flange 19 at its lower end upon which is supported a conical bearing ring 20, while 21 designates a conical bearing ring surrounding the top of the collar 18 and slidable vertically thereon for a purpose that will appear presently. The work table 2 is provided with a radially projecting flange 22 affording shoulders at the top and bottom thereof against which rest the conical bearing rings 23 and 24, while 25 designates conical roller bearings located between the rings 20 and 21, and 24 and 23, respectively.

26 designates an adjusting plate that is secured to the collar 18 by means of bolts 27, and the required adjustment is obtained by one or more shims 28 positionable between the lower surface of the adjusting plate 26 and the top of the collar 18. By tightening the adjusting plate 26 against the collar 18, the collar is drawn upwardly bringing with it the lower ring 20 until there is a snug fit between the lower rings 20 and 24 and the roller bearings between them, and at the same time the upper ring 21 is forced downwardly by the adjusting plate 26, the outer edge of which engages the upper ring 21 as shown, until a snug fit is had between the bearing rings 21 and 23 and the roller bearings 25 between them. It will thus be observed that by a single operation, i. e. by adjusting the plate 26 both of the spaced apart upper and lower bearings are simultaneously and equally adjusted and that it is insured that both of the bearings will have the same closeness of fit, since by the described movement the adjusting pressure is equally apportioned automatically. The required number of shims 28 may be inserted between the adjusting plate 26 and the collar 18 to afford a close fit between these parts when the bolts 27 are tightened and to maintain the bearings properly adjusted.

As wear takes place in the bearings, if looseness occurs, the bearings are taken up by removing the adjusting plate 26 and taking out one or more of the adjusting shims to permit a greater upward movement of the collar 18, the adjustment thus effected being automatically apportioned equally between the upper and lower bearings as already described. In this manner, the parts can be quickly assembled and tightened at any time to insure the proper relation between the table and the roller bearings, so as to effect true and accurate rotation of the table about its center. Since the roller bearings are located between the top and bottom of the table, and since the driving pinion 8 and ring gear 5 are likewise located between the top and bottom of the table, the bearings are substantially in horizontal alinement with the driving connection to the table. Thus any side thrust that might be set up by the driving pinion 8 is resisted in a direct line by the bearing assembly, and any twisting of the table or torsional strains are thus effectively prevented.

The collar 18 is rigidly secured to the upper end of the post 17 by means of bolts 29, while 30 designates a shim located between the adjacent surface of the adjusting plate and post 17 to insure a solid contact at this point and thus effect a rigid and firm assembly. The arrangement of conical bearings as described is of value and importance not only in providing for an accurate centering of the table, but also in that this arrangement prevents any vertical displacement of the table,—the cooperative inclines of the rings 21, 23 being effective to prevent any tendency of the table to lift, while the entire assembly is held secure but with a capability of easy removal by means of plate 26. The described construction is also of value and important in that it prevents the table from sagging, in case it should be loaded with a heavy load in the central portion thereof. Thus in case of such heavy central load the sleeve 18 is held from downward displacement by the post 17 and the flange 15 thereon, and the assembly comprising the conical ring 24, the rollers 25 and the ring 20 will prevent any sagging of the table center. Thus the work table is held against any movement except that of true rotation on the base, and by locating the bearing assembly in line with the driving connection to the work table, all strains and twisting moments are effectively eliminated so that the table is more perfectly balanced and has a freer and more accurate rotational movement than with structures commonly in use heretofore in this type of machinery. The bearing assembly is readily accessible to permit any necessary adjustment of the bearing rings and collar 18 by removing the cover 13 which is located in the central opening of the work table and preferably rests upon the bearing ring 23, as shown in Fig. 1.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having now described my invention, what I claim as new and desire to secure by Letters Patent is:

1. In a machine tool or the like, a work table comprising a bed equipped with an upright projection, a table rotatably mounted on said bed and with a central aperture receiving said projection, and oppositely disposed conical bearings between said table and said projection, said bearings being substantially spaced apart and adapted to oppose both upward and downward vertical working thrusts, and also to oppose diagonal thrusts transmitted to said table.

2. In a machine tool or the like as set forth in claim 1, means for relatively adjusting said conical bearings towards and from each other to take up for looseness and wear both vertically and horizontally.

3. A work table of the kind described comprising a bed equipped with an upstanding post, a table mounted to turn on said bed and around said post as a center, oppositely disposed conical bearings spaced apart along said post for accurately centering said table with respect to said post and a single means for adjusting both of said bearings simultaneously with an automatic apportionment and equalization of the adjusting movement between said bearings.

4. A work table comprising a bed equipped with an upright projection, and a table having a central aperture through which said projection extends and mounted to turn on the bed, said table and projection equipped with vertically spaced apart and oppositely disposed conical bearings, said bearings extending at a relatively small angle to the vertical axis on which said table turns and the lower bearing arranged to support the table center against downward sagging.

5. A work table comprising a bed having an upright projection, and a rotatable table centrally apertured to receive said projection, said projection and table equipped with co-operative portions of a conical bearing converging downwardly inward, the portion of said bearing borne by the table extending around the portion borne by the projection and engaging the same in a diagonally upward direction, with means for adjusting said bearing whereby the table is both centered and held from upward displacement.

6. In a vertical boring mill or the like, a work table comprising a bed equipped with an upright projection, a rotatable table having a central opening to receive said projection, and spaced apart conical bearings converging inwardly and toward each other, between said projection and said table, with means for simultaneously adjusting both of said bearings.

7. In a machine tool, the combination with a base having an upstanding support, a collar adjustably fixed on the support, upper and lower conical bearing rings adjustably and fixedly mounted respectively on said collar, of a rotatable work table mounted on the base and having a central opening to receive said support, conical bearing rings on the work table between the top and bottom thereof, and bearings arranged between said rings on the collar and work table.

8. In a machine tool, the combination with a base having an upstanding support, a collar adjustably fixed on the support, upper and lower conical bearing rings adjustably and fixedly mounted respectively on said collar, of a rotatable work table mounted on the base and having a central opening to receive said support, a gear carried by the work table, a driving pinion engaging said gear, said work table having a central opening to receive said support, conical bearing rings on the work table, and bearings arranged between the rings on the collar and work table and positioned substantially in line with the side thrust set up by said gear and pinion.

9. In a machine tool, the combination with a base having an upstanding support, a collar adjustable on the support, upper and lower conical bearing rings adjustably and fixedly mounted respectively on said collar, a head overlying said upper ring and adjustably fixed to the collar and to said support, of a rotatable work table mounted on the base and having a central opening to receive said support, a gear carried by the work table, a driving pinion engaging said gear, said work table having a central opening to receive said support, conical bearing rings on the work table, and bearings arranged between the rings on the collar and work table and positioned substantially in line with the side thrust set up by said gear and pinion.

10. In a machine tool, the combination with a base having an upstanding support, a collar fixedly attached to the support and adjustable vertically thereon, a lower conical bearing ring carried by said collar at the lower end thereof, an upper conical bearing ring arranged around the collar at the upper end thereof, a rotatable work table mounted on the base and having a central opening to receive said support, conical bearing rings on the work table, bearings arranged between the bearing rings on the work table and on the collar, a head fixedly secured to the upper end of the support and overlying said collar and upper bearing ring thereon, and means for adjustably securing the collar to the head and permitting vertical adjustment of the collar on the support.

ALFRED TROSCH.